INVENTOR.
Charles A. Smith
BY
Ralph F. Crandell
ATTORNEY

United States Patent Office 3,503,079
Patented Mar. 31, 1970

3,503,079
HEART VALVE HAVING A GUIDED VALVE FLOAT
Charles A. Smith, Denver, Colo., by order of distribution to Joane W. Smith, Denver, Colo.
Filed Sept. 5, 1967, Ser. No. 665,429
Int. Cl. A61f *1/22*
U.S. Cl. 3—1                                                   1 Claim

ABSTRACT OF THE DISCLOSURE

A heart valve prosthesis has a valve body ring formed with spaced suture flanges extending radially outwardly. A conical hollow valve float is positioned for axial movement to or from a line edge seat defined at one end of the ring. A plurality of fingers on the ring form a retaining cage for the float, and the float includes a depending stem slidably engaged through an eye defined in a guide arm projecting from the ring. All parts are formed of titanium or titanium alloy.

BACKGROUND OF THE INVENTION

Field of the invention

The present invention relates to a heart valve prosthesis. Included within this category are artificial heart valves for use as mitral valve replacements, aortic valve replacements and tricuspid valve replacements.

Description of the prior art

Many attempts have been made to provide artificial heart valve members with varying degrees of success. Early efforts were directed along the lines of reproducing in an artificial valve a valve action similar to that of the natural heart. Essentially this required the use of plastic membranes or flaps such as are illustrated in U.S. Patent 2,682,057, issued June 29, 1954, to H. A. Lord.

As an improvement, there was developed a heart valve prosthesis utilizing a ball and cage type of arrangement as shown in U.S. Patent 3,099,016, issued July 30, 1963, to M. L. Edwards. Ball type heart valves have since proven quite successful, and have been highly developed as reported by Cartwright et al. in an article entitled "Development Of A Titanium Double-Caged Full-Orifice Ball Valve," Trans. Amer. Soc. Artif. Organs., X: 231, 1964. The ball and cage type valve has been developed for use both as a mitral valve (U.S. Patent 3,099,016) and as an aorta valve as shown in U.S. Patent No. 3,263,239, issued Aug. 2, 1966, to M. L. Edwards and Albert Starr.

The ball and cage type valves utilize a titanium valve ring and cage together with a valve ball of solid silicone rubber. The valve ring is surrounded with a suture ring made of non-reactive Teflon cloth, as described in the above patents.

OBJECTS OF THE INVENTION

It is the principal object of the present invention to provide a new and improved heart valve prosthesis having optimum flow characteristics with a minimum silhouette. Another object of the invention is to provide a heart valve prosthesis in which the valve float is light in weight and has a specific gravity equal to or less than that of blood and which can be utilized either for a positive closing action against a line edge or for a full flow orifice type of construction.

A further object of the present invention is to provide a heart valve prosthesis of the above character which eliminates the need for a separate suture ring element.

Another object of the present invention is to provide a heart valve prosthesis of the foregoing type which affords full blood flow characteristics thereby making it possible to be used without the use of blood thinners.

A more specific object of the present invention is to provide a valve float element which is non-distortable, non-magnetic, non-corrosive, non-position sensitive, silent in use, and thoroughly reliable.

A further more specific object of the present invention is to provide a valve which contributes to low opening pressure and avoids damaging the blood cells and which is designed so as to be washed clean of embolisms during use.

Other objects and advantages of the invention will be apparent to those skilled in the art from the description and drawings.

SUMMARY OF THE INVENTION

The present invention comprises an all-metal heart valve prosthesis, adapted to be placed in a human heart to replace a natural heart valve such as the mitral valve or aortic valve. The valve is formed in two parts, a ring and a float, the latter having conical surface adapted to seat against a line edge on the valve ring or body. Travel of the float within the ring is limited by means of fingers extending upwardly from the ring, and the float is guided in its movement within the ring by means of a guide arm having an eye receiving a float stem depending from the valve float.

DESCRIPTION OF THE PREFERRED EMBODIMENT

Figure 1:
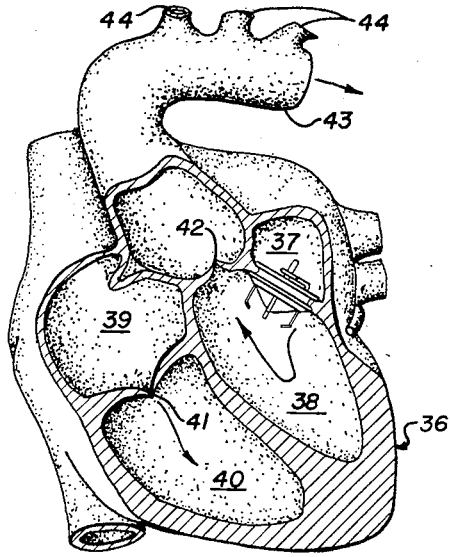
FIGURE 1 is a schematic illustration, partly in section, of a human heart having a heart valve prosthesis located therein in the mitral position.
Figure 2:
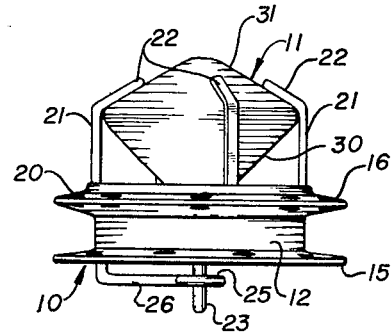
FIGURE 2 is an elevation view, substantially enlarged, of a heart valve prosthesis embodying the present invention.
Figure 3:
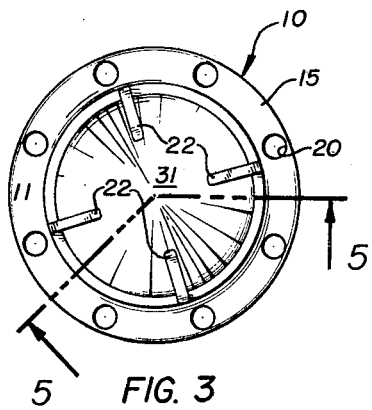
FIG. 3 is a top view of the valve shown in FIG. 2.
Figure 4:
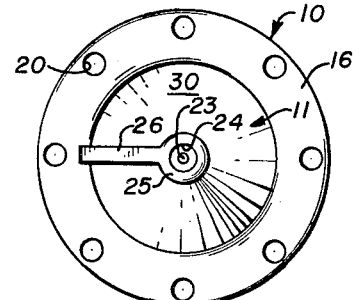
FIG. 4 is a bottom view of the valve shown in FIG. 2.

The heart valve prosthesis described herein and shown in the drawings has as its two basic parts, an integral body 10 and a float 11. The float is retained in the body and provides a pulsating or check type valve action by seating against or adjacent the body to close off flow of blood through the valve, and opening away from the body to allow blood to flow. The valve is designed to provide optimum, pulsating flow and to simulate, as closely as possible, the action of the natural heart valve which it replaces.

Both the valve body 10 and valve float 11 are preferably formed of titanium or a high titanium alloy, because of that metal's high strength, light weight, machinability and corrosion resistance characteristics. Where possible, the parts are machined from one piece of metal, and if two parts must be joined, a titanium heliarc weld is utilized. After machining and welding, the various parts are polished.

The valve body

Figure 6:
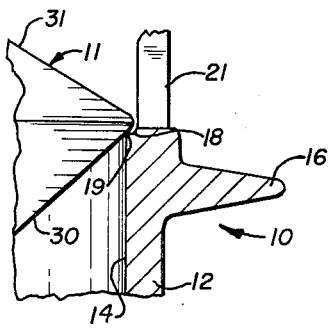
FIG. 6 is a further enlarged fragmentary view of a portion of the valve shown in FIG. 5, illustrating specifically the valve float and seat arrangement.

The valve body, as shown in the drawings, comprises an annular member or ring 12 having throat defined by a smooth internal cylindrical wall surface 14. For securing the ring 12 in a heart, there is provided thereon a pair of integral, spaced, suture flanges 15, 16 extending radially outwardly from the outer surface of the ring. One of the flanges 15 is positioned at the lower or entrance edge of the ring 12 and the internal corner 17 at the throat entrance is rounded to provide for the smooth streamlined flow of blood into the valve body throat. The other suture flange 16 is spaced axially inwardly from the upper end of the ring 12 and extends generally parallel to the lower flange 15. To define a valve seat, the internal corner of the ring 12 at the throat exit is recessed to define a concave groove 18 terminating at the inner wall surface 14 in a sharp or line edge valve seat 19, as shown in FIG. 6.

For securing the body to the heart membranes, the suture flanges contain a plurality of spaced suture holes 20. It will be observed that the holes in one flange are rotated a few degrees with respect to the holes in the other flange.

Extending upwardly from the upper end of the ring 12 is a float retaining cage defined by a plurality of float engaging fingers 21. Each finger 21 is integrally formed or welded to the ring, and is bent radially inwardly at its upper end to form a finger tip 22 which, when the valve float 11 is in its uppermost position, will lie against the upper surface of the float as hereinafter described. To guide the float 11 for axial movement in the ring 10, the float 11 is provided with a stem 23 depending therefrom through a guide eye 24 defined in the free end 25 of a guide arm 26 integrally formed or joined with the ring 10 and extending radially inwardly therefrom.

The ring 10, flanges 15, 16, float retaining fingers 21, and guide arm 26 are preferably machined as an integral unit from a piece of titanium or titanium alloy. However, with the proper welding techniques, it is possible to weld the fingers and guide arm to the ring. After machining, the ring is polished to remove all surface imperfections.

The valve float

To provide the action necessary to achieve a pulsating, unidirectional flow through the valve, there is positioned in the valve ring 10 a hollow, metallic float 11 which in its raised position affords an open passage through the valve and in its closed position prevents all, or substantially all, reverse flow. The valve float 11 shown in the drawings comprises a generally conical, hollow member the upper portion 28 of which is conical or spherical and the lower portion 29 of which defines the conical body of the float. The float is made in two parts by machining the conical body 29 and the upper portion 28 from titanium or a titanium alloy, and their peripheral edges of the parts are welded together, to provide a hermetic seal, by means of a heliarc weld process. The outer conical surface 30 of the conical body 29 is adapted to seat, at a point adjacent its outer most extremity, on the line edge seat 19 provided by the recess 18 in the valve ring 10. The walls of the conical body 29 are designed to make an angle of approximately 45° with the horizontal, and it has been observed that this angle, together with the sharp-edged seat 19 provides an exceptionally quiet valve operation. The walls of the valve are of such thickness that the float has a specific gravity of approximately equal to or less than that of blood, so that the float 11 will float in blood. The outer surface 31 of the upper portion 28 make an angle of approximately 30° with the horizontal, and as the tips 22 of the valve retaining fingers are turned radially inwardly to an angle of approximately 30°, when the float is in its upper most position the fingertips 22 will lie along the upper valve surface 31.

Figure 5:
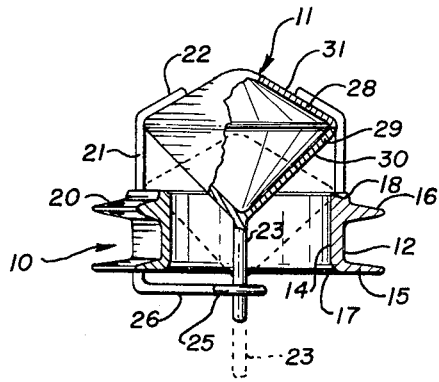
FIG. 5 is a section view taken substantially in the plane of line 5—5 on FIG. 3.

FIGURE 5 shows the valve float in its uppermost position in solid lines and in dotted lines in the valve-closed position. In order to guide the axial movement of the float and prevent the same from twisting with respect to the ring, the valve float is provided with the downwardly extending stem 23, as described above, machined integrally with the lower cup portion and extending through the aperture 25 in the guide arm 26.

Valve ring and float relation

It is known in the art that to achieve a maximum flow and minimum pressure drop through the valve, the ratio of the area of the passage between the valve seat on the ring and the surface of the valve float, in a plane perpendicular to the valve float surface, should be equal to the area of the orifice opening through the ring. It will be observed that, with the conical construction of the valve float, a minimum of valve extension above the ring is required in order to provide optimum flow. This principle is fully described in the Cartwright et al. article referred to above.

It has been observed that the noise factor of the valve embodying the present invention will be low because of the line or edge contact between the seat 19 on the ring 10 and the sloping lower surface 30 of the float 11. Additionally, the line or edge contact between the seat 19 and the float surface 30 contributes substantially to the elimination of damage to blood cells which might be caught between the float 11 and the ring 10.

The low silhouette of the valve, achieved by means of the shape of the float as described above, makes the valve particularly suitable for use in the mitral valve location. With reference to FIG. 1 there is shown a schematic representation of a heart 36 and illustrating the manner of installing the valve in a mitral location. The heart as shown has a left atrium 37, a left ventricle 38, a right atrium 39 and a right ventricle 40. The heart valve prosthesis embodying this invention is shown in place in the position of the mitral valve to prevent reverse flow from the left ventricle 38 back into the left atrium 37. A natural mitral valve 41 prevents reverse flow from the right ventricle 40 back into the right atrium 39. Blood flows from the left ventricle 38 through an aorta valve 42, into the aorta 43, from whence it is distributed into the main arteries 44 and others leading to different parts of the body.

The valve prosthesis is usually installed by making an incision through the wall of the heart into the left atrium 37. The natural mitral valve parts are removed and the valve prosthesis is installed in the same location. When the natural valve parts are removed, sufficient tissue is left to extend into the annular groove defined between the suture flanges 15 and 16, and the valve is sewed to the heart by means of the suture holes 20 in the flanges. The heart tissue then grows into the groove and the holes in the flanges so as to hold the mitral valve securely in place even after the suture threads have dissolved.

It will be observed that the pumping action of the heart causes the walls of the atrium to compress to force the blood from the atrium through mitral valve into the ventricle 38. By utilizing the low silhouette valve embodying the present invention, the danger of trauma of the heart walls from contact with the hard valve parts is eliminated or substantially reduced. The valve float 11, being of a specific gravity equal to or lighter than that of blood, the valve is non-position sensitive and allows the individual substantial freedom of movement.

It will be appreciated that the valve can also be installed in place of the natural aorta valve 42. To this end, an incision would be made in the aorta 43, the natural aorta valve parts removed and the present valve prosthesis installed in the same location.

Modifications

While the suturing flanges described herein are preferred, a conventional suture ring, made of Teflon or similar fabric as described in the art, may be utilized. In particular, it may be desirable to use a special suture ring for the aorta location. The present valve ring can be readily adapted for the conventional suture ring by reducing the radial extent of the flanges and mounting the suture ring in the groove defined between the flange stubs. The remainder of the valve would be unaffected.

I claim as my invention:

1. A metallic low silhouette heart valve prosthesis comprising, in combination, a titanium metal valve body ring defining an internal throat having a rounded edge at its entrance side and a line-edge seat defined at its exit side, a hollow double-conical titanium metal valve float positioned adjacent the exit side of said ring throat and having upper and lower conical surfaces defined thereon, the lower conical surface being adapted to sealingly engage said seat in line contact therewith, a plurality of independent retaining fingers integral with and extending axially from said ring at the exit side thereof, said fingers having generally inwardly sloping outer end tips for retainably engaging the upper conical surface of said float to retain said float in operative relationship to said ring, a titanium metal stem integral with said float and depending axially from the lower conical surface thereof, said stem extending through said ring throat, an eyelet tipped arm integral with said ring and extending radially adjacent the entrance side thereof, said eyelet being positioned axially of said ring throat for surroundingly and slidingly engaging said stem for guiding said float for axial movement with respect to said ring and seat.

References Cited

UNITED STATES PATENTS

| | | | |
|---|---|---|---|
| 3,367,364 | 2/1968 | Cruz et al. | 3—1 |
| 3,402,710 | 9/1968 | Paleschuck | 3—1 XR |
| 3,438,394 | 4/1969 | Nakib | 3—1 XR |

FOREIGN PATENTS 1,016,811  1/1966  Great Britain.

OTHER REFERENCES

"Prosthetic Replacement of the Mitral Valve" The Lancet, Nov. 24, 1962, p. 1087.

RICHARD A. GAUDET, Primary Examiner

R. L. FRINKS, Assistant Examiner

U.S. Cl. X.R.

137—533.19, 533.21